United States Patent [19]

Schafer

[11] 4,216,975
[45] Aug. 12, 1980

[54] TRACTOR HITCH

[75] Inventor: Richard A. Schafer, Traer, Iowa

[73] Assignee: Deere & Company, Moline, Ill.

[21] Appl. No.: 968,359

[22] Filed: Dec. 11, 1978

[51] Int. Cl.² .................................................. B60D 1/16
[52] U.S. Cl. ............................ 280/461 A; 280/460 A
[58] Field of Search .......... 280/456 R, 460 R, 460 A, 280/461 A, 461 R, 490 A, 479 R, 479 A; 172/439, 443, 448, 272

[56] References Cited

U.S. PATENT DOCUMENTS

| | | | |
|---|---|---|---|
| 2,393,358 | 1/1946 | Ferguson | 280/461 R |
| 2,656,776 | 10/1953 | Cox et al. | 172/459 |
| 2,683,403 | 7/1954 | Flentie | 172/460 |
| 2,914,342 | 11/1959 | Silver | 280/461 A |
| 3,791,456 | 2/1974 | Koch | 172/450 |

*Primary Examiner*—John J. Love
*Assistant Examiner*—Randall A. Schrecengost

[57] ABSTRACT

A tractor hitch having a rockshaft pivotally carried between a pair of tractor frames behind and below the rear axle which carries a bellcrank to which a pair of draft links and drawbar are pivotally attached. A pair of lift arms are attached to the rockshaft, one on either side of the bellcrank, and are connected by connecting links to the draft links to support and lift the draft links and drawbar upon actuation of a pair of lift cylinders connected to the midpoints of the lift arms. A coupler frame with a three-point hitch is carried by the rear end of the draft links and is held in an upright position by three links connected to the upper portion of the tractor frames to define a four-bar linkage to allow translation of the coupler frame relative to the rear axle. A bellcrank actuator is actuable to rotate the bellcrank to move the draft links either forward or back to tilt the coupler frame and move the drawbar forward and back. Sway links are connected to the bellcrank and to the draft links to provide sway control for the draft links and drawbar.

57 Claims, 7 Drawing Figures

TRACTOR HITCH

BACKGROUND OF THE INVENTION

The present invention relates generally to tractor hitches and more particularly to a hitch configuration in which visiblity of the tractor to implement connectors, the ease of coupling to an implement, ease of use, versatility, performance and total vehicle design styling has been maximized.

In the past, visibility of the couplers on the three-point hitch and the drawbar connector was not a significant problem. The operator on a standard sized tractor was so close to the hitch that neither the rockshaft housing nor the center link on the three-point hitch presented a significant obstruction to the operator's line of sight. The rockshaft was positioned high on the tractor body and the center link was connected along the fore and aft center line of the tractor near the rockshaft.

As tractors have become larger, the old hitch configuration has continued to be used with mere structural upgrading. As the huge four wheel drive articulated tractors have evolved, this has resulted in a sacrifice in the ability to directly observe the tractor to implement connection. Some manufacturers have used the expedients of mirrors or even closed-circuit television cameras to observe the hitch area. Heretofore, no serious consideration has been given to changing the hitch configuration to maximize visibility for the even larger tractors which are expected in the future or of utilizing an improved hitch configuration on standard sized tractors to replace the current hitches.

Also in the past, it was expected that implements which were too heavy to be moved manually would be connected by judiciously maneuvering the tractor into position next to the implement and lifting the hitch. If the implement would not move into hitching position, the hitch would be lowered and the tractor would have to be moved again and the hitching operation tried again. This trial and error positioning was also required for connecting a drawbar implement to the drawbar connector. Thus, tractor operators generally had to have a high level of skill.

Another practice in the past was to have the draft link convergence, or the intersection in the tractor body of the forces applied at the rear ends of the draft links, to be at the front axle. This was to assure that when the front wheels were turned for steering on a two-wheel drive tractor, the hitch would cause the implement to follow the front wheels into a turn. This principle was retained with the advent of four-wheel drive articulated tractors since those skilled in the art believed that the implement should follow the front wheels.

In the early four-wheel drive tractors, it was quickly discovered that abrupt steering changes would often cause failures of the hitch components on the implements because of the imposition of large lateral loads because the rear axle to which the implement was secured would "wiggle" relative to the front axle. In more recent tractors, these failures which are a symptom of the excessively large lateral loads were treated by preventing the tractor from making abrupt steering changes, which is a case of treating the sympton rather than the problem.

In conventional two and four wheel drive tractors, sway and anti-sway control is achieved primarily by repositionable sway blocks which are located near the forward end of the draft links. As larger tractors have drawn larger implements, larger lateral operational loads have been imposed on the rear ends of the draft links requiring that the draft links be increased in size to increase strength. This increase in size has generally been detrimental to overall tractor styling.

SUMMARY OF THE INVENTION

The present invention provides a tractor hitch in which visibility of the hitch couplers, ease of use, versatility, and performance have been maximized specifically for articulated tractors but with applicability to non-articulated tractors.

The visibility has been maximized by positioning the draft link supporting rockshaft down near the forward ends of the draft links and replacing the conventional center link arrangement for the three-point hitch with a four bar linkage to provide substantially unobstructed lines of sight to the hitch coupler and drawbar connector.

The ease of use has been maximized by providing three dimensional power adjustability for engaging an implement. A bellcrank is provided on the rockshaft and the draft links, drawbar and sway links are connected to it. The bellcrank is oscillatable by a bellcrank actuator to cause fore and aft movement of the draft links and drawbar and thus of the hitch couplers and drawbar connector for one dimension of adjustability. The tractor can be articulated to cause transverse movement of the hitch couplers and drawbar for a second dimension of adjustability, and lift cylinders lift the draft links and drawbar to cause vertical movement for a third dimension of adjustability. This allows the operator to approach an implement to position one of the hitch couplers, place the tractor in "park", and then move the hitch or the tractor articulation to engage the implement.

The fore and aft movement of the draft links can further be used to change the mast angle of the implement on the go which is an additional desirable feature for in-field operational adjustment which increases the versatility of the hitch.

The versatility has also been increased by providing left and right hand lower hitch couplers which in the standard location allows a first category of implements to be towed and which allows a second category of implements to be towed when they are interchanged.

The performance has been maximized by simplifying the hitch and combining the functions of the conventional load sensing shaft to which the draft links are attached (as disclosed in the U.S. Pat. No. 2,940,530 granted to DuShane) and the conventionally positioned rockshaft into a single draft link proximate rockshaft which positions the hitch while carrying the bellcrank to which the draft links are attached. Thus, the draft loads may be sensed directly from the bellcrank actuator rather than through a load sensing shaft.

The performance has further been improved by preventing large lateral loads from being imposed on the implement hitch by having the convergence of the draft links substantially at the rear axle of the tractor. This permits the implement to be drawn around a turn in an exact following relationship with the tractor as disclosed in copending application Ser. No. 968,360 which is incorporated herein by reference thereto.

The performance has still further been improved by providing sway links connected between the bellcrank and to the draft links for adjustably holding the draft links near the imposed loads in no sway and limited sway positions while relying on sway blocks to provide no sway in transport operations.

The above and additional advantages of the present invention will become apparent to those skilled in the art from a reading of the following detailed description when taken in conjunction with the accompanying drawings.

DESCRIPTION OF THE PREFERRED EMBODIMENT

Figure 1:
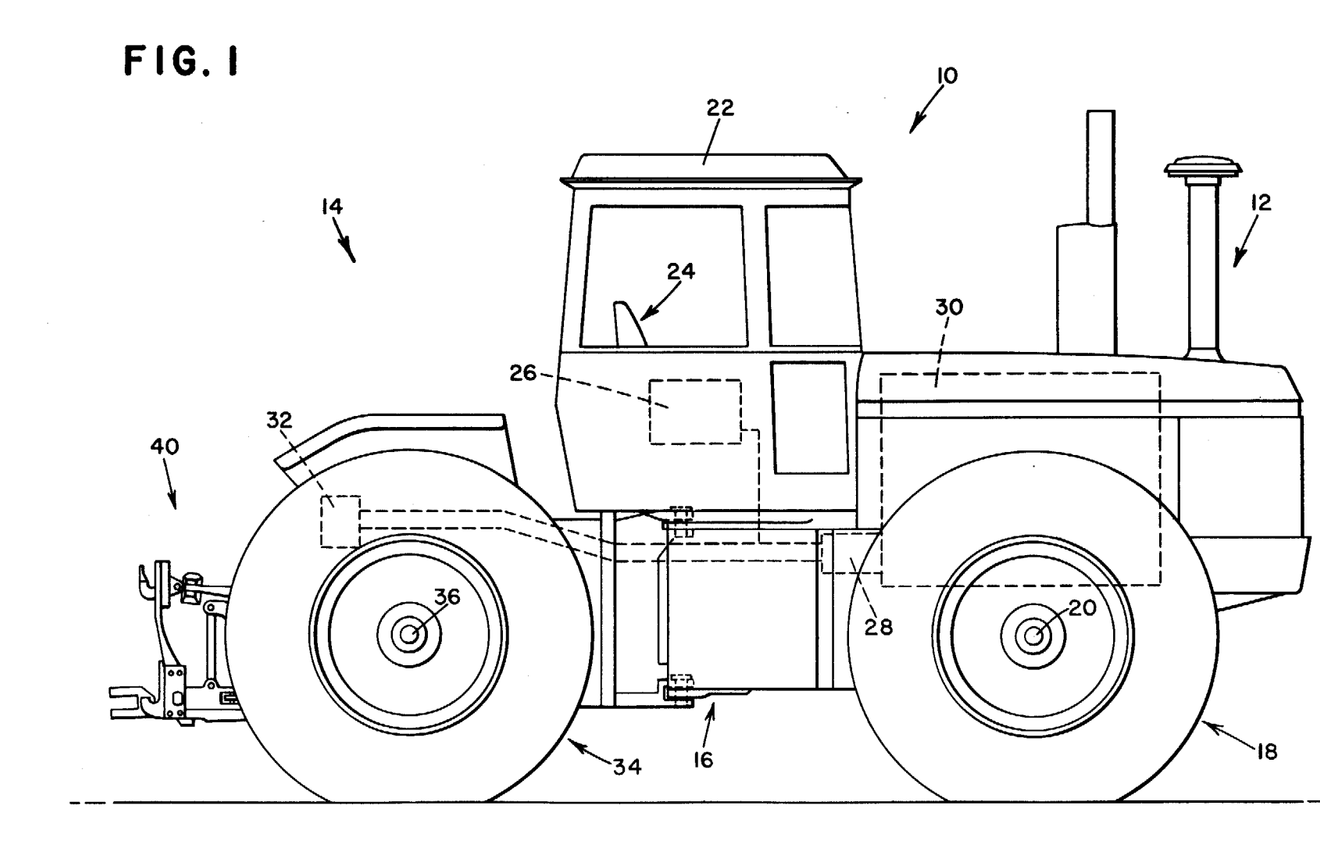
FIg. 1 is a right side view of an agricultural four wheel drive articulated tractor carrying the present invention.

Referring now to FIG. 1, therein is shown an agricultural four wheel drive articulated tractor 10 having a forward section 12 and an aft section 14 joined at an articulation joint 16. The forward section 12 is carried by front wheels 18 rotatable about a front axis 20. The forward section 12 carries a tractor cab 22 which contains an operator's seat 24 from which an operator can operate hydraulic system controls 26 which are connected to a hydraulic pump 28 on an internal combustion engine 30. The hydraulic system controls 26 are further connected to hitch hydraulic control valves 32 in the aft section 14.

The aft section 14 is carried by rear wheels 34 which are rotatable about a transversely extending rear axis 36. The aft section 14 carries the hitch hydraulic control valves 32 which control a hitch arrangement generally designated by the numeral 40.

Figure 2:
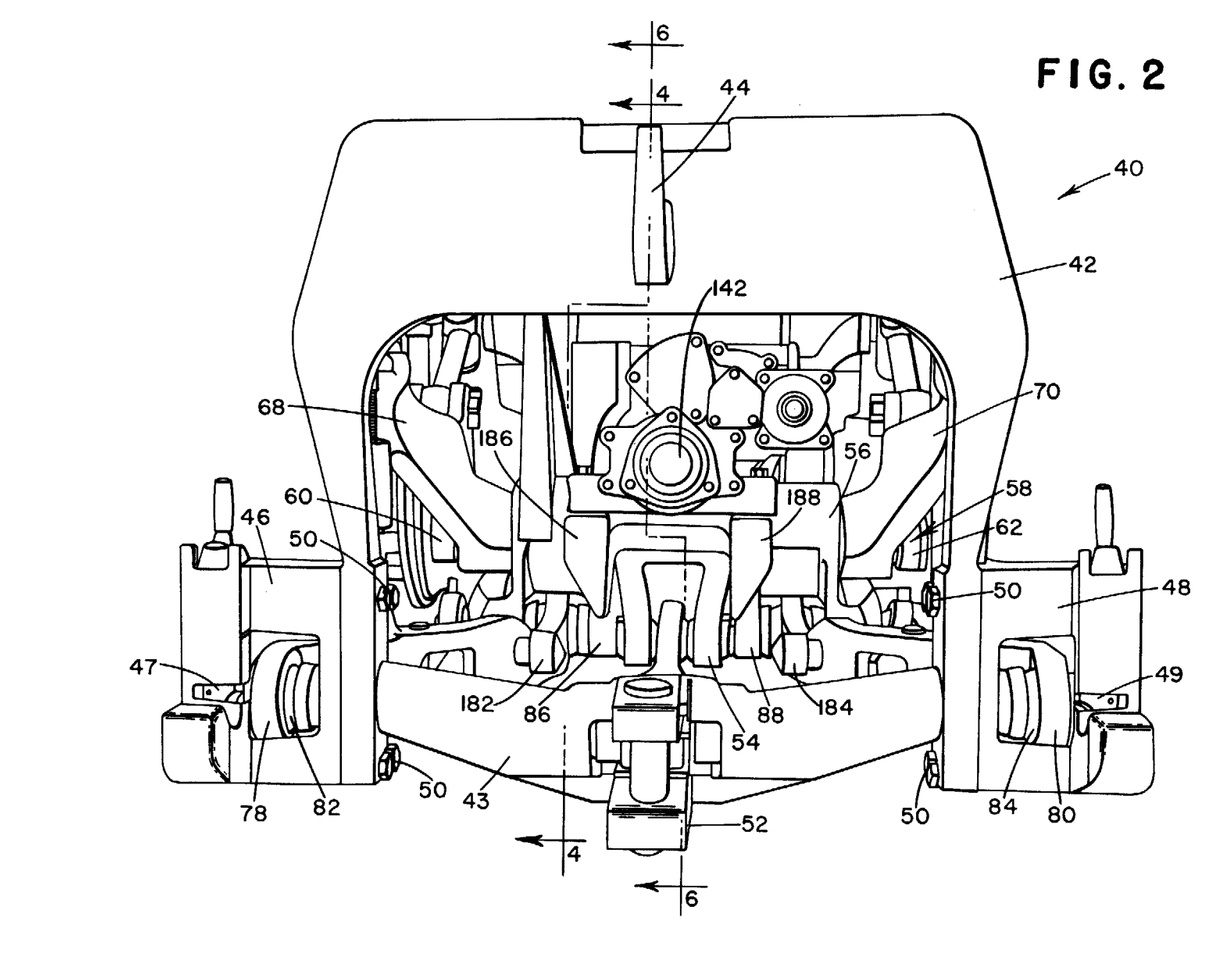
FIG. 2 is a portion of the rear view of the present invention.

Referring now to FIG. 2 which shows a rear view of the hitch 40, therein is shown a coupler frame 42 which carries a center coupler 44 and left and right couplers 46 and 48. The left and right couplers 46 and 48 are respectively left and right handed and are connected to the coupler frame 42 by connector bolts 50. The left and right couplers respectively include left and right latches 47 and 49 for securing any implement (not shown) attached thereto.

Figure 3:
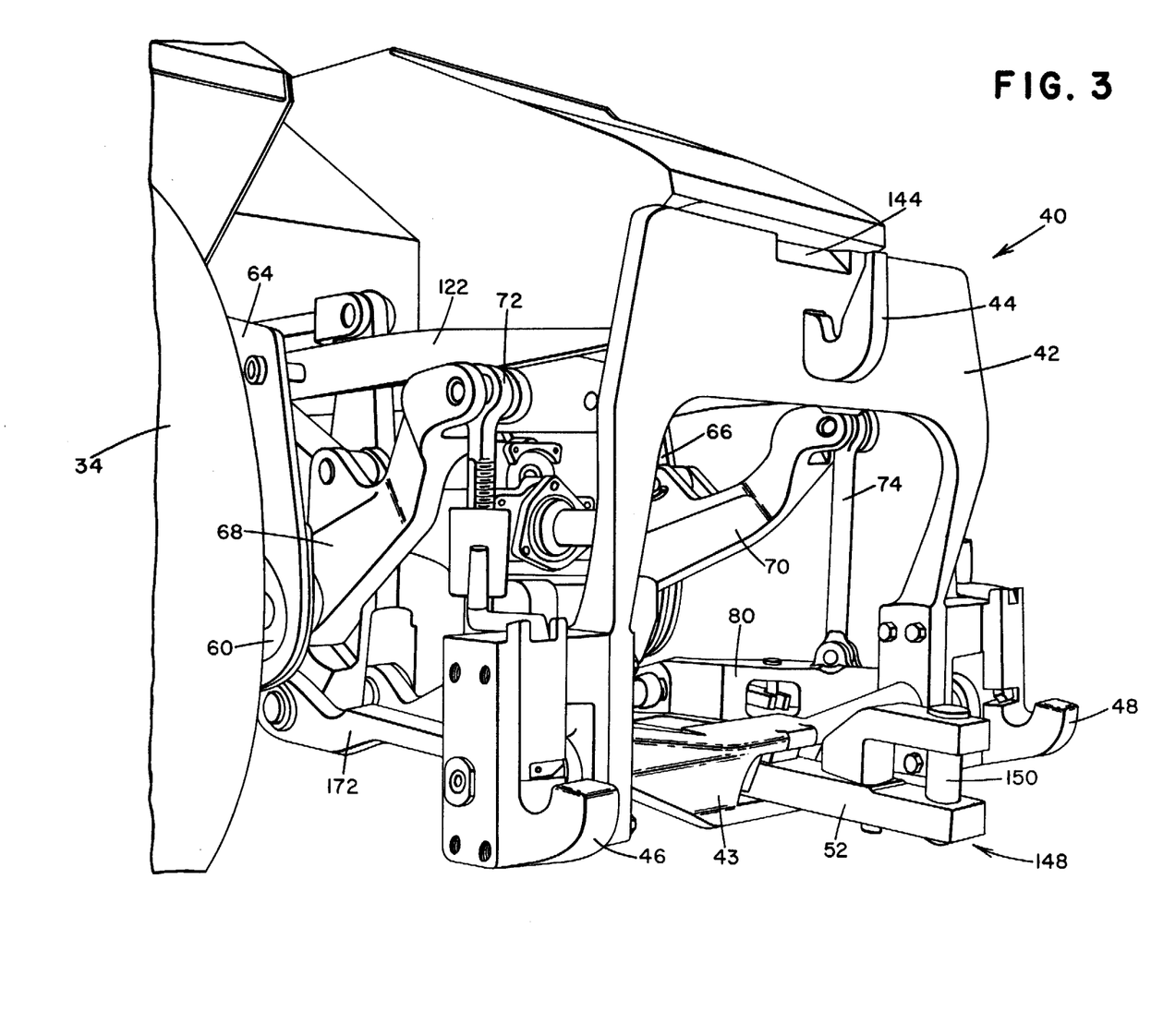
FIG. 3 is a view taken from the left rear side of the tractor showing another portion of the present invention.

The coupler frame 42 further carries a coupler support 43 having an opening for a drawbar 52 which is pivotally connected to the drawbar ears 54 of a bellcrank 56. The bellcrank 56 is pivotally mounted on a rockshaft 58 which is pivotally carried by left and right bearing cups 60 and 62 which are carried by left and right frames 64 and 66 which may be seen in FIG. 3. The left and right frames 64 and 66 are carried by the aft section 14 of the tractor 10.

On the left and right of the bellcrank 56 as seen in FIG. 2 are left and right lift arms 68 and 70 which are splined to the rockshaft 58. The left and right lift arms 68 and 70 are respectively connected by left and right connecting links 72 and 74 (shown in FIG. 3) to left and right draft links 78 and 80 (shown in FIG. 2). The left and right draft links 78 and 80 at their aft ends support the coupler frame 42 through left and right spherical bearings 82 and 84 which allow homokinetic ball and socket movement between the coupler frame 42 and the draft links 78 and 80. The forward end of the draft links 78 and 80 are homokinetically connected to the bellcrank 56 at left and right draft link ears 86 and 88.

Figure 4:
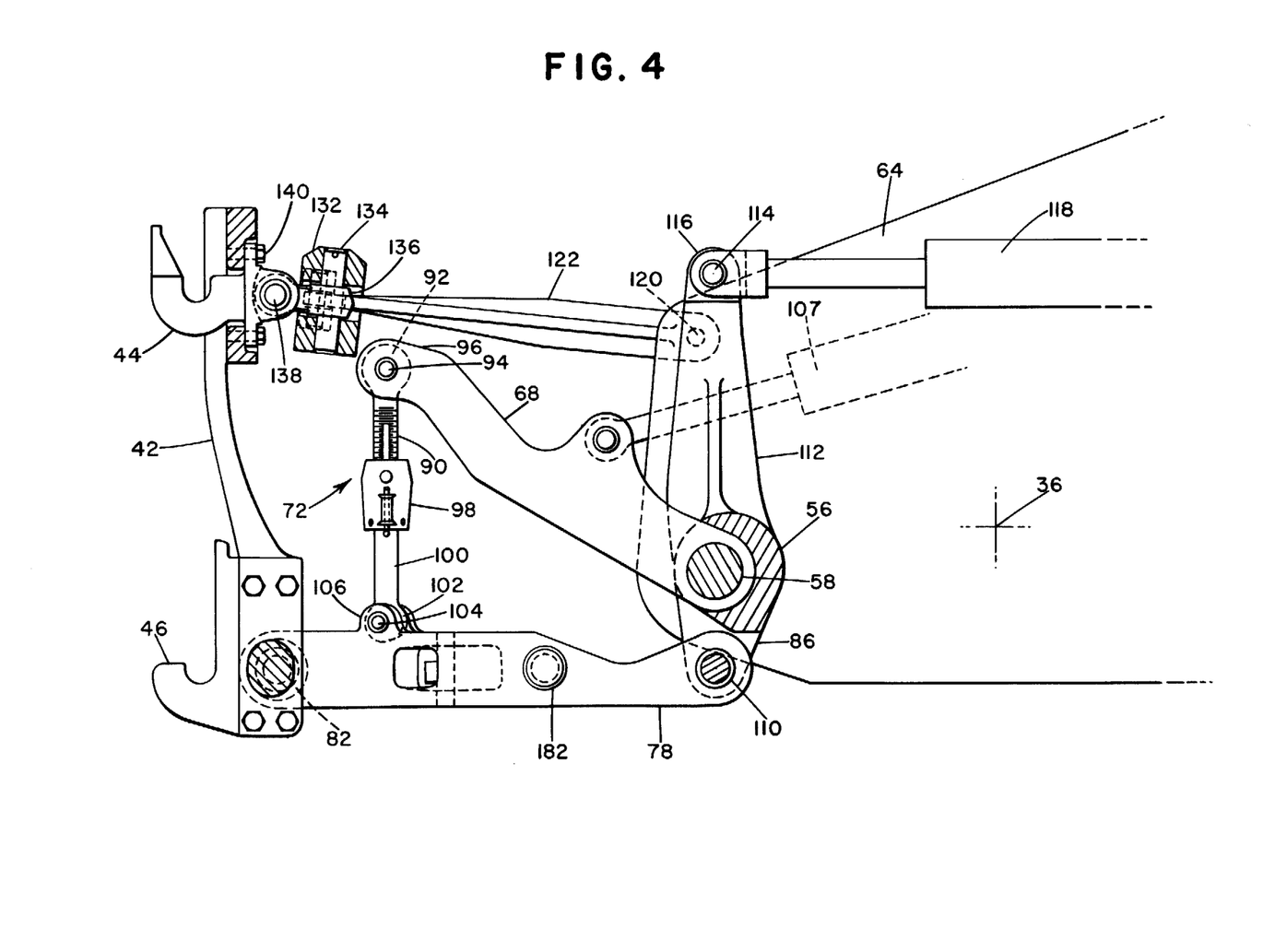
FIG. 4 is a partial cross section of the present invention taken along the line 4—4 of FIG. 2.

Referring now to FIG. 4, therein is shown a section view of the hitch 40 with special attention paid to the mechanisms which support the left draft link 78. The left connecting link 72 consists of a threaded member 90 which carries a spherical bearing 92 at its upper end for engagement with a pin 94 in a clevis portion 96 of the left lift link 68. The threaded member 90 threads into a connecting link adjustment member 98 which is connected to a non-threaded member 100 which carries a spherical bearing 102 which is connected by a pin 104 to a clevis portion 106 of the left draft link 78. Working in combination with the right connecting link 74, the connecting link adjustment 98 allows the left and right draft links 78 and 80 to be moved askew from each other.

Figure 5:
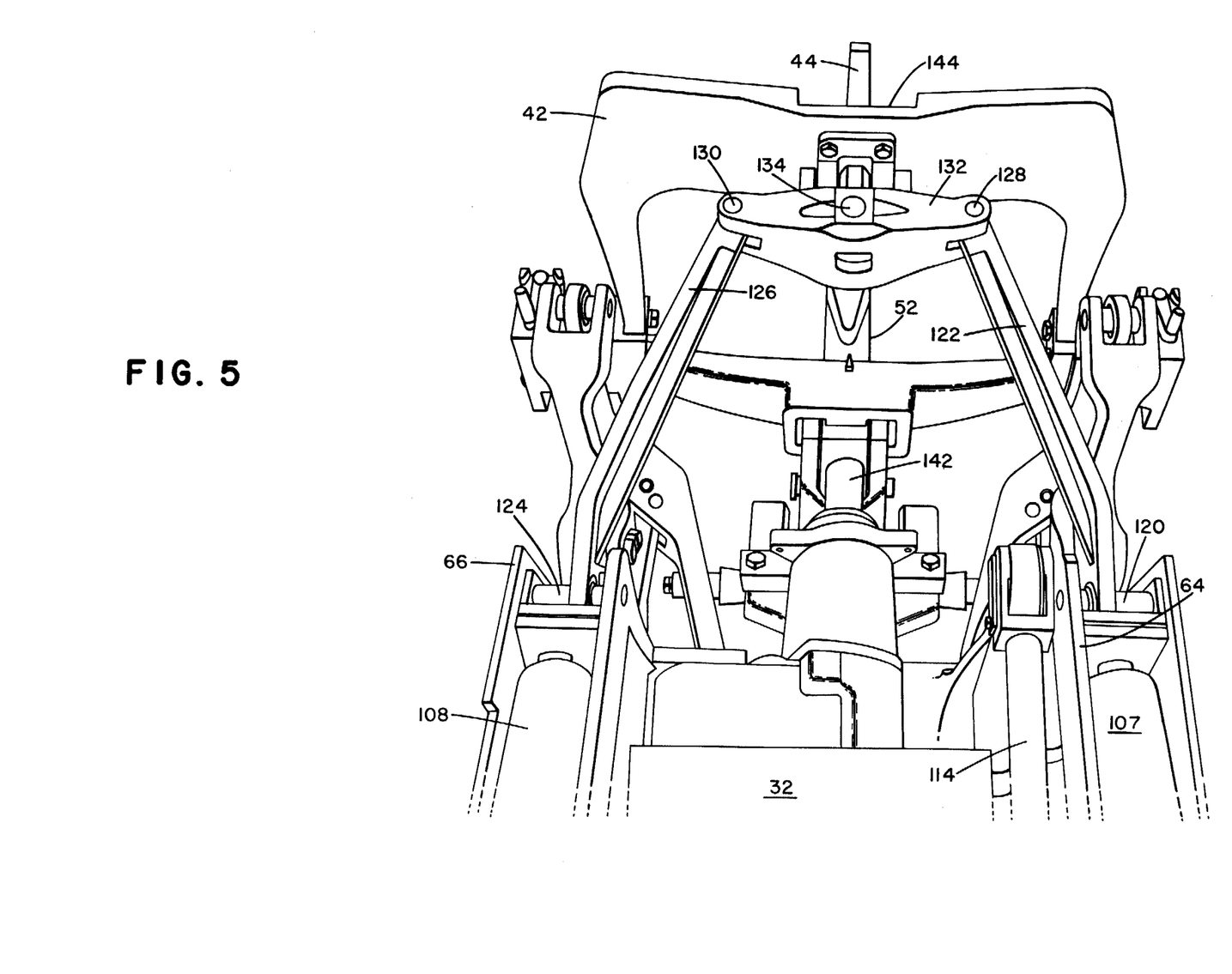
FIG. 5 is a view looking rearward and down from the top of the tractor which carries the present invention.

The up and down movement of the aft ends of the left and right draft links 78 and 80 are accomplished by means of left and right lift cylinders 107 and 108 shown in FIG. 5, which are connected to clevis portions on the left and right lift arms 68 and 70.

Referring to FIG. 4, it may be seen that the left draft link 78 is connected by a spherical bearing 110 to the left draft link ear 86 of the bellcrank 56. The bellcrank 56 includes a crank arm 112 which carries a pivot pin 114 which engages a clevis 116. The clevis 116 is secured to the rod of a bellcrank actuator 118 which is a conventional hydraulic cylinder. The bellcrank actuator 118 is pivotally secured at its head end to the left frame 64.

The left frame 64 further carries a pivot pin 120 to which a left upper link 122 is secured. Similarly, as seen in FIG. 5, a pivot pin 124 is secured to the right frame 66 to pivotally carry a right upper link 126. The left and right upper links 122 and 126 are respectively connected by pivot pins 128 and 130 to the left and right ends of a center link 132. As seen in FIG. 4, the center link 132 contains a centrally located pivot pin 134 which engages the pivot link 136. The pivot link 136 engages a second pivot pin 138 which is perpendicular to the pivot pin 134. The pin 138 is disposed in the center coupler 44 which is secured by bolts 140 to the coupler frame 42.

It may be seen by reference to FIG. 4 that the rockshaft 58 is disposed aft of and below the aft axis 36 and, it may be seen from FIG. 2 that the rockshaft 58 is also disposed below a conventional power takeoff (PTO) 142.

By referring to FIG. 5, it may be seen that the coupler frame 42 is provided with a notch 144 which is above the center coupler 44. The purpose of the notch 144 will be explained later.

Figure 6:
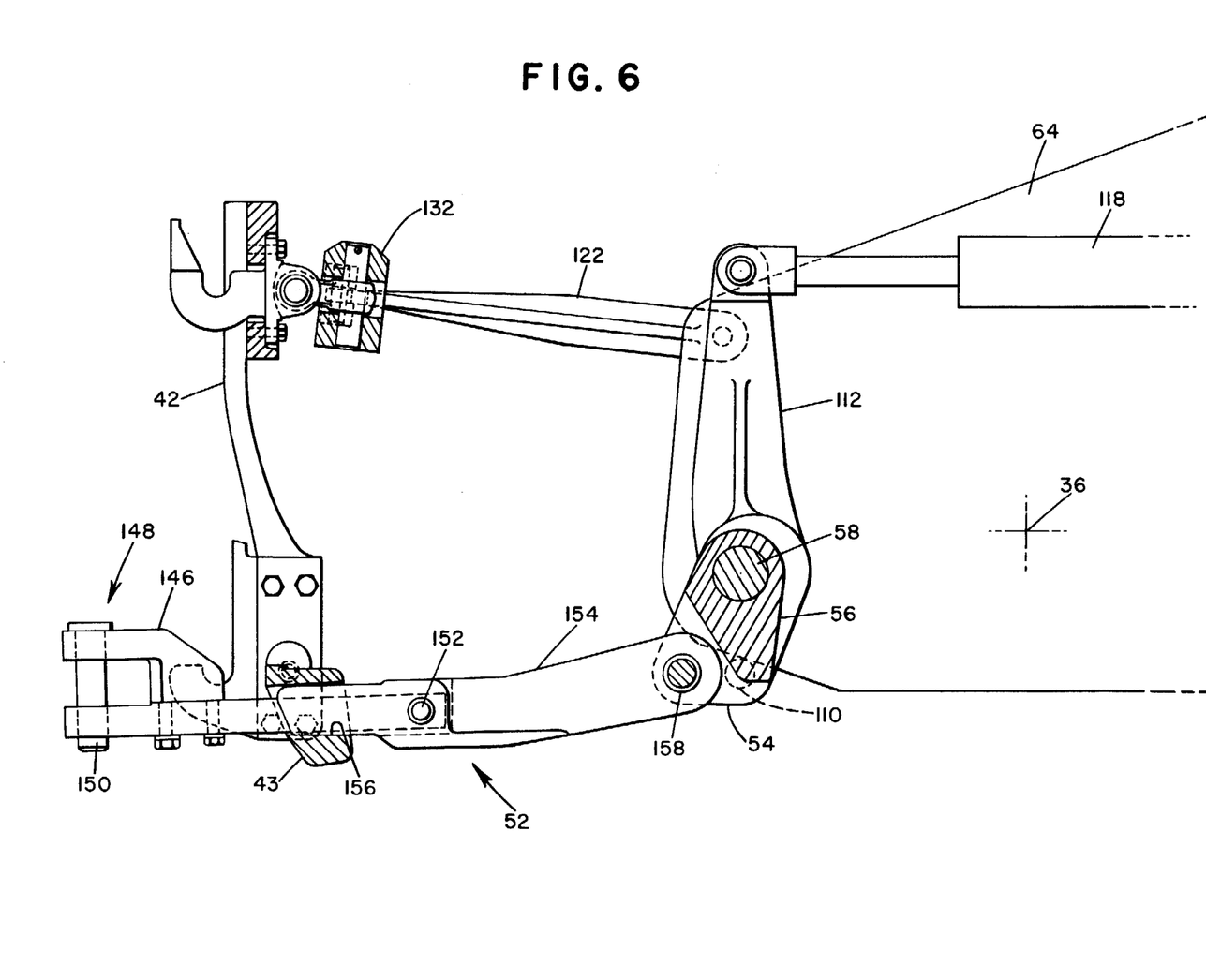
FIG. 6 is a cross-sectional view of a portion of the present invention taken along line 6—6 of FIG. 2.

Referring now to FIG. 6 therein is shown a side view of the drawbar 52. The drawbar has an aft portion 146 which carries a drawbar connector 148 into which a pin 150 is inserted. The pin 150 is removable for insertion of the tongue of a drawbar towed implement and re-insertible for allowing the implement to be towed. The aft portion 146 is connected by a connecting pin 152 to a forward portion 154. The aft end of the fore portion 154 is slidable on a slide surface 156 provided in the coupler frame 42. The front end of the forward portion 154 has a spherical bearing 158 provided therein which engages a pin in the drawbar ear 54 of the bellcrank 56. It may be seen from FIG. 6 that the spherical bearing 158 is offset from the spherical bearing 110 which represents the connection of the left and right draft links 78 and 80 to the bellcrank 56. This means that when the bellcrank 56 is pivoted, there will be relative movement between the aft portions of the drawbar 52 and the left and right draft links 78 and 80. It will also be seen in FIG. 6 that the rockshaft 58 is disposed rearwardly of and below the aft axis 36.

Figure 7:
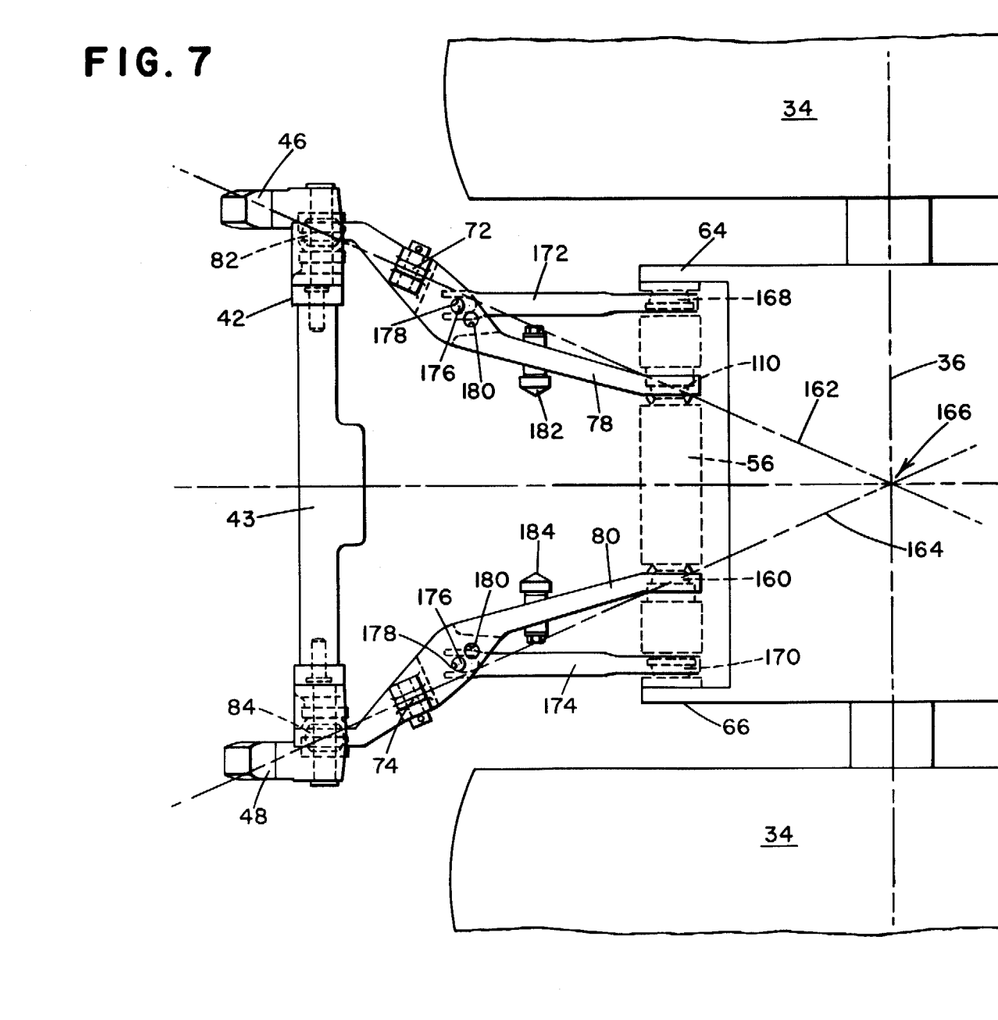
FIG. 7 is a partial plan view of the present invention with certain parts omitted for clarity.

Referring now to FIG. 7, therein is shown a partial plan view of the rear of the tractor 10. The left and right draft links 78 and 80 are shown in their direct pulling position with the aft ends thereof separated by the coupler frame 42 and the fore ends connected to the bellcrank 56 by the spherical bearing 110 and a spherical bearing 160. As may be seen, the center of the left and right spherical bearings 82 and 84 are respectively positioned in line with the centers of the spherical bearings 110 and 160 to provide left and right draft link lines of force 162 and 164 which respectively intersect at a point of convergence 166 which is substantially coincident with the aft axis 36.

Also connected to the bellcrank 56 by a pair of spherical bearings 168 and 170 are a pair of left and right sway links 172 and 174. The left and right sway links 172 and 174 engage with a pair of sway pins 176 which may be disposed in sway bores 178 or locking bores 180.

Disposed in the left and right draft links 78 and 80 are left and right sway studs 182 and 184 which provide transport sway control when the draft links are lifted by abutting left and right transport sway blocks 186 and 188 which are on the tractor body as may best be seen in FIG. 2.

OPERATION

The agricultural four-wheel drive articulated tractor 10 is controlled by an operator sitting in the seat 24. The basic movement of the hitch 40 is controlled by the hydraulic system controls 26 which the operator manipulates in order to selectively actuate the hitch hydraulic control valves 32 which selectively provide or block pressurized hydraulic fluid from the hydraulic pump 28 to the left and right lift cylinders 107 and 108 or the bellcrank actuator 118.

When an implement (of conventional design) to be towed has a three-point hitch connection, the aft portion 146 of the drawbar 52 is removed by pulling out the connecting pin 152 as seen in FIG. 6. The forward portion 154 will remain in the coupler support 43 while the center coupler 44 and the left and right couplers 46 and 48 will be exposed for connection to the implement.

To expose the center coupler 44 to connection to the top connector or mast connector of the implement, pressurized fluid is supplied to the rod end of the bellcrank actuator 118. As seen in FIG. 4, this causes the draft links 78 and 80 to move in a forward direction so as to cause the coupler frame 42 to tilt with its lower end forward. As seen in FIG. 5, this position allows the operator sitting in the seat 24 to look rearwardly and see past the notch 144 in coupler frame 42 to the tip of the center coupler 44.

The operator is able to adjust the height of the center coupler 44 by selectively pressurizing the head end of the left and right lift cylinders 107 and 108 to cause the entire coupler frame 42 to be raised or lowered by movement of the left and right lift arms 68 and 70 and therefore the left and right draft links 78 and 80.

The operator then backs the tractor 10 until the center coupler 44 is transversely in line with the mast connector on the implement. The operator then moves the tractor steering to cause the tractor 10 to articulate. This causes transverse left or right movement of the hitch 40 which allows the center coupler 44 to be centered longitudinally and transversely on the mast connector. At this point the left and right couplers 46 and 48 will not be in engagement with the two lower connectors on the implement.

Upon pressurization of the rod end of the bellcrank actuator 118, the left and right draft links 78 and 80 will be moved rearwardly so as to cause the center coupler 44 to engage the mast connector and lift the implement until the implement connectors engage the left and right couplers 46 and 48. As would be evident to those skilled in the art, the center coupler 44 is configured so as to assure that the implement connectors will always mate with the left and right couplers 46 and 48 when the implement is level with respect to the aft axis 36. If the implement is out of level, the left connecting link 72 is adjusted by threading or unthreading the connecting link adjustment 98 on the threaded member 90 which changes the relative distance between the lift and draft links to achieve this level. Once the implement is properly engaged, the left and right latches 47 and 49 are engaged to hold the implement in place.

It will be noted that the operator only needs to move the tractor and hitch transversely in line with the mast connector, engage the parking brakes, and allow the tractor articulation and the bellcrank actuator 118 to do all the final adjusting for final engagement positioning. The lift cylinders 107 and 108 are then activated to bring the implement into its operation position. Thus the operator has three dimensional power adjustability for the hitch.

While in operation, as would be evident to those skilled in the art, draft sensing of the loads created by the implement would be a relatively simple matter because the draft links 78 and 80 are connected to the bellcrank 56 which makes the pressure in the bellcrank actuator 118 proportional to the draft or load.

In the drawing shown in FIG. 2, the left and right couplers 46 and 48 are set up to draw an implement having a first predetermined distance between the lower connectors. Where desired, the left and right couplers 46 and 48 may be interchanged by loosening them from the connector bolts 50. Upon reinsertion, it will be seen that the interchanging of the couplers allows the distance between the lower connectors on the implement to be closer together than in the original arrangement. Thus two different category implements may be towed using the same hitch with only a minor modification.

When the implement to be towed is a drawbar towed implement, the aft portion 146 of the drawbar 52 will be connected to the forward portion 154. To connect up, the tractor will be backed into close proximity with the implement with the bellcrank actuator 118 in its extended position so as to cause the drawbar 52 to be in its forwardmost position.

Since the front ends of the draft links are on different centers from the front end of the drawbar 52 as seen in FIG. 6, by actuating the bellcrank actuator 118, the drawbar 52 may be moved relative to the coupler frame 42 to engage the implement. As evident from FIG. 5, the drawbar connector 148 will be visible from the seat 24 through the wishbone shape of the coupler frame 42 so as to allow proper positioning of the drawbar 52. Longitudinal positioning is again by the bellcrank actuator 118 and the transverse positioning by the tractor articulation. When the proper position is obtained, the pin 150 is dropped into the drawbar connector 148 to connect the implement to the tractor 10.

For operations where no sway or movement of the hitch 40 relative to the tractor 10 is desired, the left and right sway links 172 and 174 are positioned so as to engage the sway pins 176 when they are disposed in the locking bores 180. Since the forward ends of the left and right sway links 172 and 174 pivot on the same axis as the left and right draft links 78 and 80, regardless of the movement of the bellcrank 56 or of the left and right lift links 68 and 70, there will be no transverse movement of the hitch 40 relative to the center line of the tractor 10.

For operations where sway is desired, the left and right sway links 172 and 174 are positioned so as to engage the sway pins 176 in the sway bores 178. In this position, a limited amount of sway is possible. It is to be noticed that with the spherical bearings allowing homokinetic movement of all the links shown in FIG. 7, the coupler frame 42 will always move in translation parallel to the aft axis 36. Similarly, as seen in FIG. 5, the left and right upper links 122 and 126 working in conjunction with the center link 132 and the pivot link 136 maintain the line of force on the center coupler 44 always parallel to the center line of the tractor 10 while the coupler frame 42 moves in translation.

While sway is often desirable when towing an implement, when transporting an implement or when the tractor is being transported between fields, it is necessary that the sway be automatically locked out when the hitch 40 is in its raised position with the left and right lift cylinders 107 and 108 in their fully retracted positions. In order to accomplish this, sway studs 182 and 184 are provided in the left and right draft links 78 and 80. These sway studs will respectively abut the left and right transport sway blocks 186 and 188 as the draft links 78 and 80 are raised. In the upmost position of the draft links 78 and 80, the left and right sway studs 182 and 184 bear against the surfaces of the left and right transport sway blocks 186 and 188 to prevent any lateral movement of the coupler frame 42.

It will be noticed with reference to FIG. 5 that the center coupler 44 is connected to the left and right upper links 122 and 126 and to the coupler frame 42 in such a way that all forces imposed on the center coupler 44 by towing the implement are transmitted directly to the left and right frames 64 and 66 rather than into the coupler frame 42.

By reference to FIG. 7, it will be noted that with convergence of the left and right draft link lines of force 162 and 164 at the aft axis 36, during turns the implement will follow the tractor as though it were being pulled on a chain. This is highly desirable as explained in copending application Ser. No. 968,360, which has been incorporated herein by reference thereto.

It will also be noted that with the capability of adjusting the bellcrank 56 with the bellcrank actuator 118 it is possible to make mast angle corrections on the go so as to be able to raise and lower the front end of an implement which is being towed.

Thus, it may be seen that a high visibility, versatility, performance, and easy to use hitch arrangement has been disclosed which is integrated into vehicle styling.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

What is claimed is:

1. A hitch for a vehicle having a fore-and-aft extending body having left and right sides carried by fore-and-aft pairs of ground-engaging wheels respectively mounted on left and right extending fore-and-aft axles and carrying a fluid power system, comprising: frame means integral with the left and right sides of said vehicle body; left and right fore-and-aft extending draft links having respective fore ends pivotable proximate said frame means and having respective aft ends respectively distal from the respective fore ends thereof; left and right extending rockshaft means disposed proximate the fore ends of said left and right draft links pivotally secured to said frame means below a horizontal plane passing through said aft axle, said rockshaft serving as a load carrying means for said left and right draft links, left and right fore-and-aft extending lift arms having respective fore ends fixed to said rockshaft means proximate said frame means and having aft ends respectively distal from the respective fore ends thereof; left and right vertically extending lifting means having respective upper ends respectively connected to the aft ends of said left and right lift arms and having respective lower ends respectively connected to said left and right draft links between the respective fore-and-aft ends thereof; and fluid lift actuator means fluidly connected to said fluid power system and operatively connected to said left and right lift arms to cause pivotation of said rockshaft means with said left and right lift arms pivoting to cause pivotation of said left and right draft links.

2. The hitch as claimed in claim 1 including left and right extending bellcrank means slidably encircling said rockshaft means and pivotally carrying said left and right draft links below said rockshaft means and bellcrank fluid actuator means connected to said fluid power system and to said bellcrank means to cause pivotation of said bellcrank means.

3. The hitch as claimed in claim 1 wherein said left and right lifting means includes means for adjusting the relative distance between said respective upper and lower ends.

4. The hitch as claimed in claim 1 including a left and right extending coupler frame means connected to the respective aft ends of said left and right draft links, left and right fore and aft extending upper links respectively disposed vertically above said left and right draft links and having respective fore ends respectively pivotally secured to said left and right frame means and having respective aft ends respectively distal from the respective fore ends thereof, and a left and right extending center member having left and right ends respectively pivotally secured to the aft ends of said left and right upper links and pivotally secured between the left and right ends thereof to said coupler frame means.

5. The hitch as claimed in claim 4 wherein said vehicle body includes an operator seat mounted thereon and said coupler frame means includes coupler means provided thereon and an opening provided therein located along an imaginary line of sight extending between a point located centrally above said seat and said coupler means.

6. The hitch as claimed in claim 5 wherein said coupler frame means has fore and aft sides and said coupler means extends from said aft side to said fore side and is secured to said coupler frame on said fore side thereof and to said center member between the left and right ends thereof.

7. The hitch as claimed in claim 1 including left and right extending bellcrank means slidably encircling said rockshaft means and pivotally carrying said left and right draft links below said rockshaft means, bellcrank fluid actuator means connected to said fluid power system and to said bellcrank means to cause pivotation of said bellcrank means, a vertical left and right extending coupler frame means coupled to the respective aft ends of said left and right draft links, and a fore and aft extending drawbar means slidable in said coupler frame means and having an aft end carrying a drawbar connector and having a fore end pivotally secured to said bellcrank means for fore and aft movement of said drawbar means upon pivotation of said bellcrank means.

8. The hitch as claimed in claim 7 wherein said vehicle body includes an operator seat mounted thereon and said coupler frame means has an opening provided therein, said opening being located along an imaginary line of sight extending between a point located centrally above said seat and said drawbar connector.

9. The hitch as claimed in claim 8 including left and right fore and aft extending upper link means connecting said coupler frame means to said frame means and wherein said rockshaft means is disposed below said imaginary line of sight and said left and right upper link means are respectively disposed to the left and right of said imaginary line of sight.

10. The hitch as claimed in claim 1 including means for spacing the aft ends of said left and right draft links to cause forces applied thereto to be transmitted by the respective fore ends thereof into said vehicle body along converging lines which intersect proximate said aft axle.

11. The hitch as claimed in claim 10 wherein said means for spacing the aft ends of said left and right draft links includes coupler means.

12. The hitch as claimed in claim 1 including left and right extending bellcrank means slidably encircling said rockshaft means and pivotally carrying said left and right draft links below said rockshaft means, and left and right fore and aft extending sway links having respective fore ends respectively pivotally secured to said bellcrank means respectively proximate the fore ends of said left and right draft links and having respective aft ends respectively securable to said left and right draft links between the respective fore and aft ends thereof to limit left and right movements thereof.

13. The hitch as claimed in claim 12 wherein said left and right draft links include respective left and right locking means provided therein for preventing left and right movements of said left and right draft links.

14. A hitch for a vehicle having a fore and aft extending body having left and right sides and carrying a fluid power system, comprising: frame means integral with the left and right sides of said vehicle body; left and right fore and aft extending draft links having respective fore ends pivotable proximate said frame means and having respective aft ends respectively distal from the respective fore ends thereof; left and right draft link support means respectively connected to said frame means for respectively supporting said left and right draft links in a plurality of pivoted positions; a left and right extending rockshaft disposed proximate the fore ends of said left and right draft links pivotally secured to said frame means; bellcrank means pivotally mounted on said rockshaft and pivotally carrying the respective fore ends of said left and right draft links cooperating with said draft link support means for causing fore and aft movement thereof upon pivotation of said bellcrank means; and bellcrank fluid actuator means secured to said bellcrank means and said vehicle body and connected to said fluid power system to cause pivotation of said bellcrank means.

15. The hitch as claimed in claim 14 wherein said left and right draft link support means respectively include left and right fore and aft extending lift arms having respective fore ends fixedly secured to said rockshaft respectively proximate said left and right frame means and having aft ends respectively distal from the respective fore ends thereof, left and right fore and aft extending fluid lift actuator means fluidly connected to said fluid power system and having respective fore ends pivotally connected to said left and right frame means spaced from said rockshaft and having respective aft ends respectively connected to said left and right lift arms between the fore and aft ends thereof to cause pivotal movement of said left and right lift links, said left and right vertically extending lifting means having respective upper ends respectively connected to the aft ends of said left and right lift links and having respective lower ends respectively connected to said left and right draft links between the respective fore and aft ends thereof to cause pivotal movement of said left and right draft links upon pivotal movement of said left and right lift links.

16. The hitch as claimed in claim 15 wherein said left and right lifting means include means for adjusting the relative distance between said respective upper and lower ends.

17. The hitch as claimed in claim 14 including a left and right extending coupler frame means connected to the respective aft ends of said left and right draft links, left and right fore and aft extending upper links respectively disposed vertically above said left and right draft links and having respective fore ends respectively pivotally secured to said left and right frame means and having respective aft ends respectively distal from the respective fore ends thereof, and a left and right extending center member having left and right ends respectively pivotally secured to the aft ends of said left and right upper links and pivotally secured between the left and right ends thereof to said coupler frame means.

18. The hitch as claimed in claim 17 wherein said vehicle body includes an operator seat mounted thereon and said coupler frame means includes coupler means provided thereon and an opening provided therein located along an imaginary line of sight extending between a point located centrally above said seat and said connector means.

19. The hitch as claimed in claim 18 wherein said coupler frame means has fore and aft sides and said connector means extends from said aft side to said fore side and is secured to said coupler frame on said fore side thereof and to said center member between the left and right ends thereof.

20. The hitch as claimed in claim 14 including a vertical left and right extending coupler frame means coupled to the respective aft ends of said left and right draft links, a fore and aft extending drawbar means slidable in said coupler frame means and having an aft end carrying a drawbar connector and having a fore end pivotally secured to said bellcrank means for fore and aft movement of said drawbar means upon pivotation of said bellcrank means.

21. The hitch as claimed in claim 20 wherein said vehicle body includes an operator seat mounted thereon and said coupler frame means has an opening provided therein, said opening being located along an imaginary line of sight extending between a point located centrally above said seat and said drawbar connector.

22. The hitch as claimed in claim 21 including left and right fore and aft extending upper links connected to said frame means, a center member connected to said upper links and to said coupler frame means, and wherein said rockshaft is disposed below said imaginary line of sight and said left and right upper links are respectively disposed to the left and right of said imaginary line of sight and said center member is disposed above said imaginary line of sight.

23. The hitch as claimed in claim 22 wherein said drawbar means includes a fore portion connected to said bellcrank means and an aft portion carrying said drawbar connector.

24. The hitch as claimed in claim 14 wherein said vehicle includes left and right aft ground engaging drive wheels rotatable on a left and right extending aft axis therethrough and said left and right draft links are disposed relative to said vehicle body to cause forces applied to the respective aft ends thereof to be transmitted by the respective fore ends thereof into said vehicle body along converging lines which intersect substantially at said aft axis.

25. The hitch as claimed in claim 14 wherein said vehicle includes left and right aft ground engaging drive wheels rotatable on a left and right extending aft axis therethrough and said rockshaft is disposed aft of and below said aft axis.

26. The hitch as claimed in claim 14 including left and right fore and aft extending sway links having respective fore ends respectively pivotally secured to said bellcrank means respectively proximate the fore ends of said left and right draft links and having respective aft ends respectively securable to said left and right draft links between the respective fore and aft ends thereof to limit left and right movements thereof.

27. The hitch as claimed in claim 26 wherein said left and right draft links include respective left and right locking means provided therein for preventing left and right movements of said left and right draft links.

28. The hitch as claimed in claim 14 wherein said vehicle includes transport sway control means to prevent left and right movements of said left and right draft links at predetermined pivoted positions of said left and right draft links.

29. A hitch for a vehicle having a fore and aft, and left and right extending body having a left and right extending aft axis of rotation for aft ground engaging wheels and carrying a fluid power system to tow an implement having tow connector means provided thereon, comprising: left and right frame means respectively integral with the left and right extensions of said vehicle body; a left and right extending rockshaft disposed aft of and below said aft axis and pivotally secured to said left and right frame means; left and right extending bellcrank means pivotally encircling said rockshaft and including a crank arm extending radially therefrom; bellcrank fluid actuator means pivotally secured to said crank arm and to said vehicle body, and connected to said fluid power system and to cause selective pivotation of said crank arm means and said bellcrank means; left and right fore and aft extending draft links having respective fore ends homokinetically connected to said bellcrank means spaced from said rockshaft and respectively proximate said left and right frame means whereby pivotation of said bellcrank means causes fore and aft motion of said draft links, and having respective aft ends distal from said fore ends carrying means adapted for connection with said tow connector means on said implement; and left and right draft link support means respectively secured to the left and right frame means, said left and right draft links, and said rockshaft to respectively support said left and right draft links in a plurality of pivoted fore and aft positions.

30. The hitch as claimed in claim 29 wherein said left and right draft link support means includes left and right fore and aft extending lift arms having respective fore ends fixedly secured to said rockshaft respectively proximate said left and right draft links and having respective aft ends respectively distal from their respective fore ends thereof, left and right fore and aft extending fluid lift actuator means fluidly connected to said fluid power system and having respective fore ends respectively pivotally connected to said left and right frame means spaced distally from said rockshaft and having respective aft ends respectively pivotally connected to said left and right lift arms between the fore and aft ends thereof to simultaneously cause parallel pivotal movement of said left and right lift arms with said rockshaft, and left and right vertically disposed lifting means having respective upper ends respectively homokinetically connected to the aft ends of said left and right lift arms and having respective lower ends respectively homokinetically connected to said left and right draft links between the respective fore and aft ends thereof to cause homokinetic movement of said left and right draft links upon pivotal movement of said left and right lift arms.

31. The hitch as claimed in claim 30 wherein said left lifting means includes adjusting means for changing the distance between the upper and lower ends thereof.

32. The hitch as claimed in claim 29 wherein said means adapted for connection with said tow connector means includes vertically and left and right extending coupler frame means homokinetically connected to said left and right draft links, and including left and right fore and aft extending upper links respectively disposed vertically above said left and right draft links and having respective fore ends respectively homokinetically secured to said left and right frame means and having respective aft ends respectively distal from the respective fore ends thereof, a center member having left and right upper links for pivotation about vertical axes, and pivot means pivotally secured at the fore end thereof to between the left and right ends of said center member and at the aft end thereof to said coupler frame means for pivotation about a left and right extending horizontal axis.

33. The hitch as claimed in claim 32 wherein said vehicle body includes an operator seat mounted thereon and said coupler frame means includes center coupler means provided thereon and an opening provided therein on the upper portion thereof located along an imaginary line of sight extending between a point located centrally above said seat and said center coupler means.

34. The hitch as claimed in claim 33 wherein said coupler frame means has fore and aft sides and a coupler opening provided therein, said upper coupler means extends through said coupler opening and is secured to said coupler frame means on said fore side thereof, said upper coupler means pivotally secured to said pivot means.

35. The hitch as claimed in claim 29 wherein said means adapted for connection with said tow connector means includes vertically and left and right extending coupler frame means homokinetically connected to said left and right draft links, and including a fore and aft extending drawbar having a fore end homokinetically secured to said bellcrank means spaced from said rockshaft and disposed between said left and right draft links and movable fore and aft upon pivotation of said bellcrank means and slidable in said coupler frame means, and having an aft end connected to said fore end and carrying a drawbar connector adapted for connection with said tow connector means on said implement.

36. The hitch as claimed in claim 35 wherein said vehicle body includes an operator seat mounted thereon and said coupler frame means has an opening provided therein, said opening being located along an imaginary line of sight extending between a point located centrally above said seat and said drawbar connector.

37. The hitch as claimed in claim 36 including left and right fore and aft extending upper links connected to said frame means, a center member connected to said upper links and to said coupler frame means, and wherein said rockshaft is disposed below said imaginary line of sight and said left draft and upper links and said right draft and upper links are respectively disposed to the left and right of said imaginary line of sight and said center member is disposed above said imaginary line of sight.

38. The hitch as claimed in claim 37 wherein said coupler frame means includes a left and right extending spacer having a drawbar opening provided therein and said fore end connected to said bellcrank means is slidable in said drawbar opening and said aft end carrying said drawbar connector is removably carried by said fore portion.

39. The hitch as claimed in claim 29 wherein said means adapted for connection with said tow connector means includes vertically and left and right extending coupler frame means homokinetically connected to said left and right draft links and spacing the aft ends of said left and right draft links in a juxtaposition wherein forces applied to said coupler frame means are transmitted by the respective fore ends of the left and right draft links into said vehicle body along converging lines which intersect substantially at said aft axis.

40. The hitch as claimed in claim 29 wherein said bellcrank fluid actuator means and said left and right draft link support means are disposed above said rockshaft and said left and right draft links are disposed below said rockshaft.

41. The hitch as claimed in claim 29 including left and right fore and aft extending sway links having respective fore ends homokinetically connected to said bellcrank means respectively left and right of said left and right draft links and having respectively aft ends respectively securable to said left and right draft links between the respective fore and aft ends thereof to limit left and right movements thereof.

42. The hitch as claimed in claim 41 wherein said left and right draft links respectively include links cooperative with the aft ends of said left and right sway links to selectively prevent left and right movements of said left and right draft links.

43. The hitch as claimed in claim 42 including transport sway control means disposed above and between said left and right draft links abuttable with said left and right draft links at preselected pivoted positions of said left and right draft links to cooperate with said coupler frame means to prevent left and right movements of said left and right draft links when said vehicle is operated in a transport mode.

44. The hitch as claimed in claim 29 wherein said means adapted for connection with said tow connector means on said implement includes left and right couplers disposed respectively proximate said left and right draft links removable from said means and interchangeable to adapt to different low connector means on a different implement.

45. A hitch to tow a tow connector means equipped implement for vehicle carrying a fluid power system and having a forward body section carried by left and right forward drive wheels rotatable on a fore axis articulately joined to an aft body section carried by left and right aft drive wheels rotatable on an aft axis, comprising: left and right frame means integral with said aft body section respectively disposed inwardly of said left and right aft drive wheels; a left and right extending rockshaft disposed aft of and below said aft axis and pivotally secured to said left and right frame means; left and right bellcrank means pivotally encircling and carried by said rockshaft, said bellcrank means including an upwardly extending crank arm and downwardly extending left and right clevis portions respectively proximate said left and right frame means; bellcrank fluid actuator means connected to said fluid power system and pivotally secured to said left frame means, said bellcrank fluid actuator means actuable by said fluid power system to cause selective pivotation of said bellcrank means; left and right fore and aft extending draft links having respective fore ends respectively homokinetically connected to said left and right clevis portions of said bellcrank means, said left and right draft links having respective aft ends respectively having left and right homokinetic bearings provided therein distal from said respective fore ends, said left and right draft links having respective left and right connecting clevis portions on the upper portions thereof between the respective fore and aft ends; left and right generally fore and aft extending lift arms having respective fore ends fixedly secured to said rockshaft respectively to the right and left of said bellcrank means and having respective aft ends respectively including left and right connecting clevis portions, said left and right lift arms respectively having left and right actuator clevis portions provided in the upper portions thereof between the respective fore and aft ends; left and right generally fore and aft extending lift fluid actuator means connected to said fluid power system and respectively pivotally secured to said left and right frame means at the respective fore ends of said lift fluid actuator means and to said left and right actuator clevis portions of said respective left and right lift arms at the respective aft ends of said lift fluid actuator means, said lift fluid actuator means actuable by said fluid power system to cause selective pivotation of said left and right lift links; left and right generally vertically extending lifting means having respective upper ends homokinetically secured to the respective connecting clevis portions of said left and right lift arms and having respective lower ends homokinetically secured to the respective connecting clevis portions of said left and right draft links; and coupler frame means connected to said left and right homokinetic bearings of said left and right draft links, said coupler frame means having coupler means adapted for connection to said implement tow connector means.

46. The hitch as claimed in claim 45 wherein said left lifting means includes an upper portion carrying the upper end thereof and a lower portion carrying the lower end thereof connected by a collar for increasing and decreasing the distance between said upper and lower portions.

47. The hitch as claimed in claim 45 including left and right fore and aft extending upper links disposed aft and above said aft axis, said left and right upper links having respective fore ends respectively homokinetically secured to said left and right frame means and having respective aft ends including left and right pivot means disposed distally from said respective fore ends; a center member having left and right sides respectively connected to said left and right pivot means of said respective left and right upper links, said center member including pivot means disposed equidistant between said left and right sides; and a pivot link pivotally secured to said pivot of said center member and pivotally secured to said coupler means on said coupler frame means to cause all movements of said coupler frame means to be translational relative to said aft axis.

48. The hitch as claimed in claim 47 wherein said means adapted for connection with said tow connector means on said implement includes left and right couplers disposed respectively proximate said left and right draft links removable from said means and interchangeable to adapt to different tow connector means on a different implement.

49. The hitch as claimed in claim 45 wherein said forward body section includes an operator seat mounted thereon and said coupler frame means includes coupler means provided thereon and an opening provided therein located along an imaginary line of sight extending between a point located centrally above said seat and said connector means.

50. The hitch as claimed in claim 49 including left and right fore and aft extending upper links connected to said frame means, a center member connected to said upper links, and a pivot link connecting said center member to said coupler means and said coupler frame means, and wherein said rockshaft is disposed below said imaginary line of sight and said left lift arms and upper links and said right lift arms and upper links are respectively disposed to the left and right of said imaginary line of sight and said center member is disposed above said imaginary line of sight.

51. The hitch as claimed in claim 45 wherein said frame means includes a spacer having a drawbar opening provided therein and including a fore and aft extending drawbar having a fore end homokinetically connected to said bellcrank means between said left and right draft links and slidable in said drawbar opening, said drawbar including an aft portion removably securable to said fore portion and carrying a drawbar connector on the aft end thereof connectible to said tow connector means on said implement.

52. The hitch as claimed in claim 51 wherein said forward body section includes an operator seat mounted thereon and said coupler frame means has an opening provided therein, said opening being located along an imaginary line of sight extending between a point located centrally above said seat and said drawbar connector.

53. The hitch as claimed in claim 45 wherein said coupler frame means spaces said left and right draft links relative to said aft body section to cause forces applied to said coupler frame means to be transmitted by the respective fore ends of said left and right draft links into said aft body section along converging lines which intersect at said aft axis.

54. The hitch as claimed in claim 45 including left and right fore and aft extending sway links having respective fore ends homokinetically secured to said bellcrank means respectively outwardly of said left and right draft links, and said left and right sway links having respective aft ends respectively securable to said left and right draft links between the respective fore and aft ends thereof to prevent left and right movements of said coupler frame means in all pivoted positions of said left and right draft links.

55. The hitch as claimed in claim 54 wherein said left and right draft links include pin means cooperative with said left and right sway links to allow limited left and right movement of said connector frame means.

56. The hitch as claimed in claim 55 wherein said left and right draft links have locking holes provided therein disposed to contain said pin means to prevent left and right movement of said connector frame means.

57. The hitch as claimed in claim 56 wherein said aft body section includes transport sway control means cooperative with said left and right draft links to prevent left and right movements of said coupler frame means in predetermined pivoted positions of said left and right draft links.

* * * * *